(12) United States Patent
Duchesne-Vallade et al.

(10) Patent No.: US 12,712,363 B2
(45) Date of Patent: Aug. 18, 2026

(54) DYNAMIC SWITCHING BETWEEN AN ENERGY SOURCE AND STORED ENERGY FOR A DOMINANT LOAD

(71) Applicant: Energy Applied, Inc., New York, NY (US)

(72) Inventors: Pierre Duchesne-Vallade, New York, NY (US); Ben Colman, New York, NY (US); Somsack Lavivanh, New York, NY (US)

(73) Assignee: Energy Applied, Inc., New York, NY (US)

( * ) Notice: Subject to any disclaimer, the term of this patent is extended or adjusted under 35 U.S.C. 154(b) by 427 days.

(21) Appl. No.: 18/243,653

(22) Filed: Sep. 7, 2023

(65) Prior Publication Data

US 2024/0106234 A1 Mar. 28, 2024

Related U.S. Application Data

(60) Provisional application No. 63/409,180, filed on Sep. 22, 2022.

(51) Int. Cl.

| | |
|---|---|
| ***H02J 3/007*** | (2026.01) |
| ***F24F 11/88*** | (2018.01) |
| ***H02J 3/17*** | (2026.01) |
| ***H02J 3/32*** | (2026.01) |
| ***H02J 105/55*** | (2026.01) |
| *H02J 101/24* | (2026.01) |
| *H02J 101/40* | (2026.01) |

(52) U.S. Cl.
CPC .............. *H02J 3/0075* (2020.01); *H02J 3/17* (2026.01); *H02J 3/32* (2013.01); *F24F 11/88* (2018.01); *H02J 2101/24* (2026.01); *H02J 2101/40* (2026.01); *H02J 2105/55* (2026.01)

(58) Field of Classification Search
CPC .. H02J 3/0075; H02J 3/144; H02J 3/32; H02J 2300/24; H02J 2300/40; H02J 2310/64; H02J 3/14; F24F 11/88; F24F 11/47
See application file for complete search history.

(56) References Cited

U.S. PATENT DOCUMENTS 6,455,954 B1 * 9/2002 Dailey .................... H02J 9/062 307/85
10,840,735 B1 * 11/2020 Cooper ..................... H02J 3/32

(Continued)

*Primary Examiner* — Rami R Okasha
(74) *Attorney, Agent, or Firm* — Steven Stupp

(57) ABSTRACT

Power-management techniques are described. In the power-management techniques, a computer system (such as a cloud-based computer system or a local computer system) dynamically controls an energy source that provides electrical power to a load at a location. Notably, the computer system selectively transitions between use of a (typically external) energy source (such as a power grid associated with a utility or power supplier, hydroelectric, a generator or a solar array) and an energy storage device (such as a battery or a battery array, thermal power storage, a mechanical flywheel, or another type of energy storage device) at the location to provide electrical power to at least a dominant (e.g., highest power-consuming) load at the location. Note that the selective transitions may be based at least in part on a price of electricity and/or carbon intensity of electricity.

19 Claims, 11 Drawing Sheets

(56) References Cited

U.S. PATENT DOCUMENTS

2009/0127932 A1* 5/2009 Warren .................... H02J 9/06 307/64
2012/0046798 A1* 2/2012 Orthlieb .................... H02J 3/32 700/297
2012/0296451 A1* 11/2012 Kaps .................... H04L 67/125 700/83
2013/0214608 A1* 8/2013 Kubota .................... H02J 3/381 307/82
2014/0214213 A1* 7/2014 Rockenfeller ........... F24F 11/63 700/276
2014/0379160 A1* 12/2014 Fallon .................... H02J 3/32 700/297
2015/0362938 A1* 12/2015 Dempsey ................ G07F 17/20 700/297
2015/0378381 A1* 12/2015 Tinnakornsrisuphap .................... F24F 11/47 700/295
2017/0126018 A1* 5/2017 Buffenbarger .......... H02M 7/04
2018/0031533 A1* 2/2018 Rawat .................... G06Q 50/06
2018/0034299 A1* 2/2018 Seman, Jr. .............. H02J 9/061
2019/0067989 A1* 2/2019 Beg .................... H02J 3/381
2021/0400601 A1* 12/2021 Lee .................... H04B 1/1607
2022/0173603 A1* 6/2022 Miller .................... H02J 7/0068
2022/0247175 A1* 8/2022 Ganger .................... H02J 3/388
2023/0291206 A1* 9/2023 Winter .................... G05B 19/042
2024/0039283 A1* 2/2024 Justin .................... H02J 3/144

* cited by examiner

DYNAMIC SWITCHING BETWEEN AN ENERGY SOURCE AND STORED ENERGY FOR A DOMINANT LOAD

CROSS REFERENCE TO RELATED APPLICATIONS

This application claims priority under 35 U.S.C. 119(e) to U.S. Provisional Application Ser. No. 63/409,180, entitled "Dynamic Switching Between an Energy Source and Stored Energy for a Dominant Load," by Pierre Duchesne, et al., filed on Sep. 22, 2022, the contents of which are herein incorporated by reference.

FIELD

The described embodiments relate to a power system that dynamically switches between an energy source (such as a power grid) and stored energy (such as a battery) for a dominant load at a location.

BACKGROUND

The energy grid faces the threats of blackouts and power outages. Consequently, consumer (or residential) and business electricity customers are confronted by increased energy risks that can result in sudden and significant increases (e.g., 100×) in energy prices. This is a potential disaster for the environment and electricity customers. In principle, central grids can help facilitate an energy transition towards a more complicated and sophisticated architecture that aggregates microgrids and silos. However, a power system in which a home energy solution connects to actual energy or power grids remains a hypothetical solution.

Today, solutions such as solar, wind and water-derived energy are typically limited to large scale deployments that are unavailable to most consumers, especially those at the lower income levels. Current solutions include: smart thermostats; home energy storage; smart HVAC energy management; distributed energy storage management (DERMS); virtual power plants; and portable power batteries.

As demonstrated by recent blackouts and dramatic price increases in California and Texas, energy vulnerabilities highlight a need by consumers to access improved: hardware infrastructure; energy management; and trading relationships. Notably, in the current paradigm, consumers typically have a single local energy provider and are usually locked into whatever energy cost is set at any time, without limit. Consequently, during the recent blackouts and near-blackouts in California, energy prices increased over 100× and consumers were not notified until weeks later when they received their power bills.

The absence of solutions that protect consumers from power outages, skyrocketing power prices, and/or provide information about power costs for a heterogenous power system (with diverse energy sources) is a source of great frustration for consumers.

SUMMARY

A computer system for managing switches or a reversing contactor is described. This computer system includes: an interface circuit that communicates with one or more switches at a location; a processor; and memory storing program instructions. During operation, the computer system determines or estimates a purchasing power of a commodity (such as a price of electricity) and/or a carbon intensity of electricity. When the price of electricity and/or the carbon intensity of electricity exceeds a threshold, the computer system instructs a first switch in the switches or the first switch electrically connected to a reversing contactor to electrically decouple a dominant load at the location from an external power source and instructs a second switch at the location or the first switch electrically connected to the reversing contactor at the location to electrically couple the dominant load to an energy storage device at the location, wherein the dominant load has a largest power consumption at the location.

Note that the external power source may include: a power grid associated with a utility or a power supplier, or a solar array.

Moreover, the dominant load may include an HVAC system or a heat-pump system.

Furthermore, the energy storage device may include a battery.

Additionally, the computer system may be remotely located from the location.

In some embodiments, when the price of electricity and/or the carbon intensity of the electricity is less than the threshold, the computer system may instruct the second switch or the first switch electrically connected to the reversing contactor to electrically decouple the dominant load from the energy storage device, and may instruct the first switch to electrically recouple the dominant load to the external power source.

Note that the computer system may concurrently and independently manage multiple locations, which include the location.

Moreover, the threshold may include a user-defined threshold.

Furthermore, the threshold may include a dynamically determined threshold. For example, the dynamically determined threshold may be based at least in part on an amount of stored power in the energy storage device, a regional demand in a power grid, the carbon intensity of the power grid and/or an available regional supply in the power grid.

Additionally, the switches may include make-before-break switches, switches electrically connected to reversing contactors, or breakers.

Another embodiment provides a switch or a reversing contactor that performs at least some of the aforementioned the operations or counterparts to at least some of the aforementioned operations.

Another embodiment provides a system that includes one or more switches or reversing contactors, and the computer system.

Another embodiment provides an electronic device that controls and/or monitors the dynamic management of the energy storage device.

Another embodiment provides a non-transitory computer-readable storage medium for use with the computer system, the switch, the reversing contactor, the system or the electronic device. The non-transitory computer-readable storage medium may store program instructions that, when executed by the computer system, the switch, the reversing contactor, the system or the electronic device, cause the computer system, the switch, the reversing contactor, the system or the electronic device to perform at least some of the aforementioned operations.

Another embodiment provides a method for managing one or more switches or reversing contactors. This method may be performed by the computer system, at least a switch, at least a reversing contactor, the system or the electronic device and may include at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
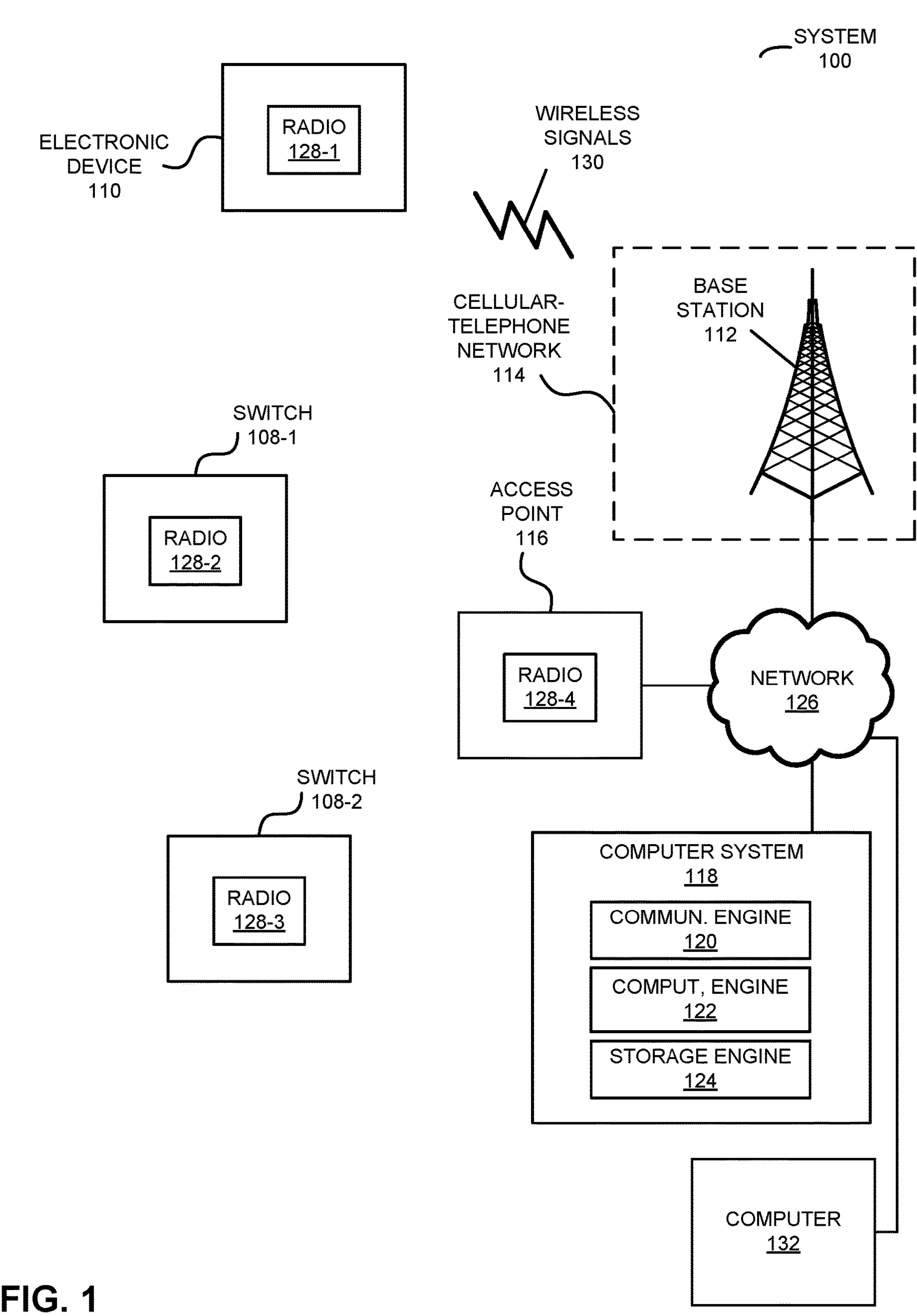
FIG. 1 is a drawing illustrating an example of a system in accordance with an embodiment of the present disclosure.

Power-management techniques are described. In the power-management techniques, a computer system (such as a cloud-based computer system or a local computer system) dynamically controls an energy source that provides electrical power to a load at a location. Notably, the computer system selectively transitions between use of a (typically external) energy source (such as a power grid associated with a utility or power supplier, hydroelectric, a generator or a solar array) and an energy storage device (such as a battery or a battery array, thermal power storage, a mechanical flywheel, or another type of energy storage device) at the location to provide electrical power to at least a dominant (e.g., highest power-consuming) load at the location. Embodiments may include: the remotely controlled breakers, switches, reversing contactors, a mobile application for controlling and monitoring the dynamic management of the energy storage device, the computer system and/or a system that includes some or all of these components. Note that the selective transitions may be based at least in part on a price of electricity and/or a carbon intensity of electricity.

By selectively and dynamically transitioning between the energy source and the energy storage device, the power-management techniques may allow the dominant load to use the energy source or the energy storage device when it is most economical and/or has reduced environmental impact (such as a reduced carbon intensity). Therefore, the power-management techniques may automatically allow consumers to take advantage of dynamic fluctuations in purchasing power and/or carbon intensity to reduce their energy cost and/or environmental impact. These capabilities may improve the user experience and satisfaction of the consumers.

In the discussion that follows, the location may be a location of a consumer (such as a house, a building, an apartment, a townhome, a condominium, etc.). However, in other embodiments, the power-management techniques may be used for business customers, such as at a factory, a data center, an office building, a company, etc. Moreover, in the discussion that follows, the dominant load may be an HVAC system (such as air conditioning, and/or electric heating). However, in other embodiments, the dominant load may be associated with other types of electrical devices and/or loads. Furthermore, while the discussion that follows illustrates the power-management techniques as dynamically switching for a dominant load, in other embodiments the dynamic switching may be applied to one or more other loads (such as loads that consume less power than the dominant load or that have different characteristics than the dominant load) or to all the loads at a location (e.g., the power to an entire location may be dynamically switched).

Moreover, in the discussion that follows, electronic devices and/or components in a system (such as a computer or a computer system) may communicate packets in accordance with one or more communication protocols, such as: a wireless communication protocol that is compatible with an Institute of Electrical and Electronics Engineers (IEEE) 802.11 standard (which is sometimes referred to as 'Wi-Fi®,' from the Wi-Fi Alliance of Austin, Texas), Bluetooth (from the Bluetooth Special Interest Group of Kirkland, Washington), an IEEE 802.15.4 standard (which is sometimes referred to as 'ZigBee,' from the Connectivity Standards Alliance of Davis, California), Z-Wave (from Sigma Designs, Inc. of Fremont, California), LoRaWAN (from the Lora Alliance of Beaverton, Oregon), Thread (from the Thread Group of San Ramon, California), IPv6 over low-power wireless personal area networks or 6LoWPAN (from the Internet Engineering Taskforce of Fremont, California), a cellular-telephone network or data network communication protocol (such as a third generation or 3G communication protocol, a fourth generation or 4G communication protocol, e.g., Long Term Evolution or LTE (from the 3rd Generation Partnership Project of Sophia Antipolis, Valbonne, France), LTE Advanced or LTE-A, a fifth generation or 5G communication protocol, or other present or future developed advanced cellular communication protocol), and/or another type of wireless interface (such as another wireless-local-area-network interface). For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, IEEE 802.11bn, or other present or future developed IEEE 802.11 technologies. Moreover, electronic devices and/or components in the system (such as an access point, a radio node, a base station or a switch) may communicate with a local or remotely located computer system using a wired communication protocol, such as a wired communication protocol that is compatible with an IEEE 802.3 standard (which is sometimes referred to as 'Ethernet'), e.g., an Ethernet II standard, Message Queueing Telemetry Transport (MQTT) and/or another type of wired interface. However, a wide variety of communication protocols may be used in the system, including wired and/or wireless communication. In the discussion that follows, Ethernet, a cellular-telephone communication protocol and/or Wi-Fi are used as illustrative examples.

Communication among electronic devices is shown in FIG. 1, which presents a block diagram illustrating an example of a system 100 that manages switches. System 100 may include: one or more switches 108 (or one or more reversing contactors), one or more electronic devices 110 (such as one or more computers and/or one or more portable electronic devices, e.g., one or more cellular telephones), optional base station 112 in cellular-telephone network 114, optional access point 116 (such as a physical access point or a virtual access point that is implemented using software), and/or a computer system 118 (such as one or more computers or servers), which are sometimes collectively referred to as 'components' in system 100. (Note that a reversing contactor may include an electrical component that switches an electrical circuit or another electrical component on or off. For example, a reversing contactor may include two contactors, wherein the wires for one of the contactors are reversed relative to the other contactor.) Moreover, computer system 118 may include: communication engine 120 (or module), computation engine 122 (or module), and/or storage engine 124 (or module).

Note that components in system 100 may communicate with each other via a network 126, such as an intranet, the Internet, a cellular-telephone network (such as cellular-telephone network 114) and/or a wireless local area network (WLAN). Thus, the communication may involve wired and/or wireless communication. In embodiments where the communication involves wireless communication, the wireless communication includes: transmitting advertising frames on wireless channels, detecting another component in system 100 by scanning wireless channels, establishing connections (for example, by transmitting association requests), and/or transmitting and receiving packets.

As described further below with reference to FIG. 11, the one or more switches 108, the one or more electronic devices 110, the optional base station 112, the optional access point 116 and/or computer system 118 may include subsystems, such as a networking subsystem, a memory subsystem and a processor subsystem. In addition, the one or more switches 108, the one or more electronic devices 110, the optional base station 112, the optional access point 116 and/or computer system 118 may include radios 130 in the networking subsystems. More generally, the components can include (or can be included within) any electronic devices with the networking subsystems that enable these components to communicate with each other. Note that wireless communication can comprise transmitting advertisements on wireless channels to enable a pair of components to make initial contact or detect each other, followed by exchanging subsequent data/management frames (such as association requests and responses) to establish a connection, configure security options (e.g., Internet Protocol Security), transmit and receive packets or frames via the connection, etc.

Moreover, as can be seen in FIG. 1, wireless signals 130 (represented by a jagged line) are transmitted by radios 128 in the components. For example, radio 128-1 in electronic device 110 may transmit information (such as packets) using wireless signals. These wireless signals may be received by radios 128 in one or more of the other components, such as by optional base station 112 or optional access point 116. This may allow electronic device 110 to communicate information to optional base station 112 or optional access point 116, and thus, to computer system 118.

In the described embodiments, processing a packet or frame in a component may include: receiving the wireless signals with the packet or frame; decoding/extracting the packet or frame from the received wireless signals to acquire the packet or frame; and processing the packet or frame to determine information contained in the packet or frame.

Note that the communication between at least any two of the components in system 100 may be characterized by one or more of a variety of performance metrics, such as: a received signal strength indication (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

As described previously, it can be difficult to provide consumers with situational awareness about power systems, such as real-time information about energy availability and associated costs and/or environmental impact.

In order to address these problems, the power-management techniques may be implemented by or using switches 108 (and/or a reversing contactor) and/or computer system 118 (which be local or remotely located from switches 108 and/or reversing contactor). Notably, computer system 118 may determine or estimate a purchasing power of a commodity (such as a price of electricity) and/or a carbon intensity of electricity. For example, computer system 118 may communicate (e.g., via network 126) with another computer 132 (such as a computer associated with a power marketplace and/or a computer associated with a provider of an external power source, e.g., a utility) to obtain information specifying a current price of electricity (or power) and/or a carbon intensity of the electricity (or power).

When the price of electricity and/or the carbon intensity of electricity, exceeds a threshold (e.g., the price is greater than $2000 per kW-hr. to $500 per MW-hr. or 0-2000 grams of CO2 per kW-hr., such as 450 grams per KW-hr.), computer system 118 may instruct (via network 126) a switch 108-1 (which may or may not be used in conjunction with a reversing contactor) to electrically decouple a dominant load at the location from an external power source (such as a power grid associated with a utility or a power supplier, or a solar array). Moreover, computer system 118 may instruct (via network 126) a switch 108-2 at the location or switch 108-1 when it is electrically connected to the reversing contactor to electrically couple the dominant load to an energy storage device (such as a battery) at the location. Note that the dominant load may have a largest power consumption at the location, such as an HVAC system.

Moreover, when the price of electricity and/or the carbon intensity of the electricity is less than the threshold, computer system 118 may instruct the second switch or the first switch electrically connected to the reversing contactor to electrically decouple the dominant load from the energy storage device. Moreover, computer system 118 may instruct the first switch to electrically recouple the dominant load to the external power source.

Note that the transitions to and/or from the energy storage device to the external power source may be performed in such a way as to avoid power disruption or glitches at the location. For example, switches 108 may include make-before-break switches or breakers.

In some embodiments, computer system 118 may concurrently and independently manage multiple locations, which include the location.

Moreover, the threshold may include a user-defined threshold (and which may include a hysteresis value). This may allow a consumer to set or define when the transitions to and/or from the external power source and the energy storage device occur. For example, the user may set the threshold and/or the hysteresis value using a software application (or a web portal) that executes on electronic device 110. Moreover, the user may use the software application to monitor operation of switches 108 (and/or the reversing contactor). This capability may allow the user to monitor cost and/or environmental impact associated with use of the external power source and/or the power storage device via the software application. For example, using the software application, the user may aggregate cost savings associated with the power-management techniques. Thus, the user may use the software application to control and/or monitor the dynamic management of the energy storage device.

Furthermore, in some embodiments, computer system 118 may dynamically determine the threshold. For example, the dynamically determined threshold may be based at least in part on an amount of stored power in the energy storage device, a regional demand in a power grid, the carbon intensity of the power grid and/or an available regional supply in the power grid. Notably, when the amount of stored power in the energy storage device is low, the regional demand in the power grid is low, the carbon intensity of the power grid is low and/or the available regional supply in the power grid is high (and, thus, the price of electricity is low), computer system 118 may set the dynamic threshold to a high value, so that the external power source is favored. Alternatively, when the amount of stored power in the energy storage device is high, the regional demand in the power grid is high, the carbon intensity of the power grid is high and/or the available regional supply in the power grid is low (and, thus, the price of electricity is high), computer system 118 may set the dynamic threshold to a low value, so that the energy storage device is favored.

Although we describe the network environment shown in FIG. 1 as an example, in alternative embodiments, different numbers or types of electronic devices may be present. For example, some embodiments comprise more or fewer components. As another example, in another embodiment, different components are transmitting and/or receiving packets or frames.

While the preceding discussion illustrated implementation of the power-management techniques using computer system 118, in general the computational techniques may be implemented in a distributed and/or a centralized manner. For example, in some embodiments, the computational techniques may be implemented using program instructions or software that is executed in an environment on a given switch (such as switch 108-1) or electronic device 110, such as an application executed in the operating system of switch 108-1 or electronic device 110, as a plugin for a Web bowser or an application tool that is embedded in a web page and that executes in a virtual environment of the Web browser (e.g., in a client-server architecture). Note that the software may be a standalone application or a portion of another application that is resident on and that executes on switch 108-1 or electronic device 110 (such as a software application that is provided with switch 108-1 or electronic device 110, e.g., by a provider associated with computer system 118, and/or that is installed on and that executes on switch 108-1 or electronic device 110).

Moreover, while the preceding discussion illustrated the power-management techniques being used to manage a source of electricity, in other embodiments the power-management techniques may be used to manage a wide variety of types of power, such as: natural gas, hydroelectric power, wind power, nuclear power, biomass power, thermal power (or geothermal power), solar power, etc.

Furthermore, in some embodiments, the dynamic transitions in the power-management techniques are based at least in part on an occupancy of an environment (such as a house, an apartment, an office, etc.). Thus, when the environment is empty or has low occupancy (such one or two individuals or pets) the threshold may be higher than when the environment has high occupancy (such as one or more individuals or pets).

Figure 2:
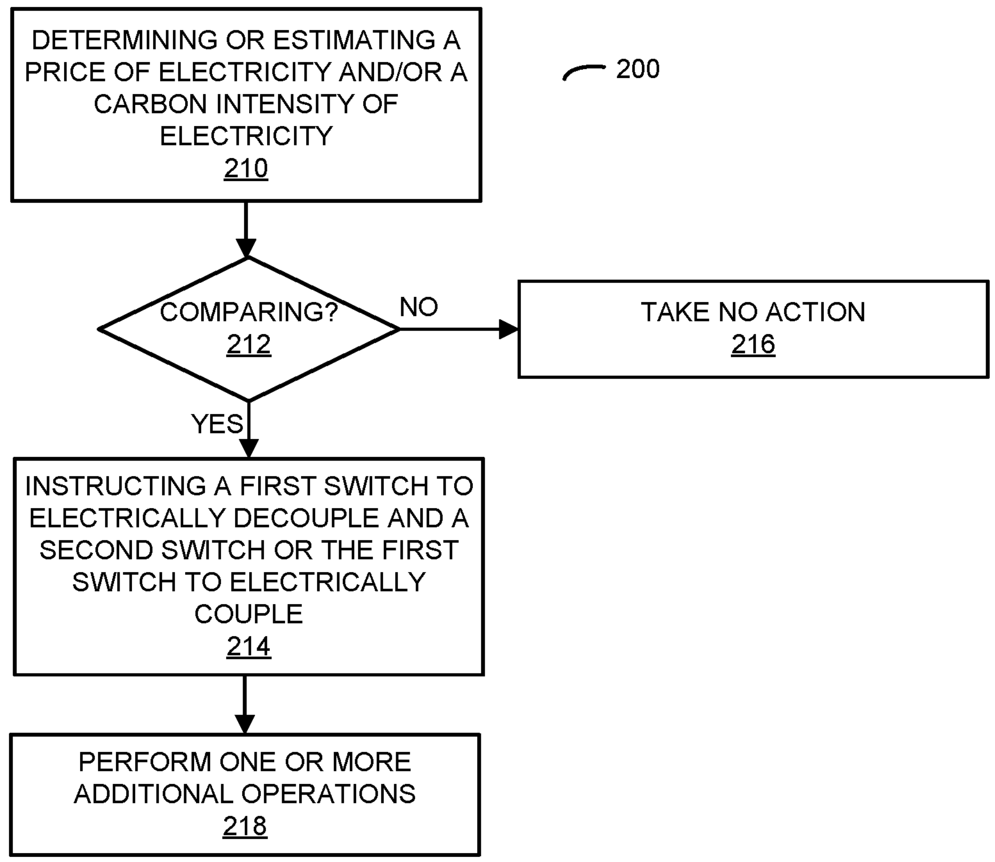
FIG. 2 is a flow diagram illustrating an example of a method for managing one or more switches or reversing contactors using a computer system in FIG. 1 in accordance with an embodiment of the present disclosure.

FIG. 2 presents embodiments of a flow diagram illustrating an example of a method 200 for managing one or more switches or reversing contactors, which may be performed by a computer system (such as computer system 118 in FIG. 1). During operation, the computer system may determine or estimate a price of electricity and/or a carbon intensity of electricity (operation 210). When the price of electricity and/or the carbon intensity of electricity, exceeds a threshold (operation 212), the computer system may instruct a first switch in the switches or the first switch electrically connected to a reversing contactor to electrically decouple a dominant load at the location from an external power source (operation 214). Moreover, the computer system may instruct a second switch at the location or the first switch electrically connected to the reversing contactor to electrically couple the dominant load to an energy storage device at the location (operation 214). Note that the dominant load has a largest power consumption at the location. Otherwise (operation 212), the computer system may take no action (operation 216).

In some embodiments, the computer system optionally performs one or more additional operations (operation 218). For example, when the price of electricity and/or the carbon intensity of the electricity is less than the threshold (e.g., subsequent to operation 214), the computer system may instruct the second switch or the first switch electrically connected to the reversing contactor to electrically decouple the dominant load from the energy storage device, and may instruct the first switch to electrically recouple the dominant load to the external power source.

Note that the external power source may include: a power grid associated with a utility or a power supplier, or a solar array. Moreover, the dominant load may include an HVAC or a heat-pump system. Furthermore, the energy storage device may include a battery.

Additionally, the computer system may be remotely located from the location.

Note that the computer system may concurrently and independently manage multiple locations, which include the location.

Moreover, the threshold may include a user-defined threshold.

Alternatively or additionally, the threshold may include a dynamically determined threshold. For example, the dynamically determined threshold may be based at least in part on an amount of stored power in the energy storage device, a regional demand in a power grid, the carbon intensity of the power grid and/or an available regional supply in the power grid.

Additionally, the switches may include make-before-break switches, switches electrically connected to reversing contactors, or breakers.

In some embodiments of method 200, there may be additional or fewer operations. Furthermore, there may be different operations. Moreover, the order of the operations may be changed, and/or two or more operations may be combined into a single operation.

Figure 3:
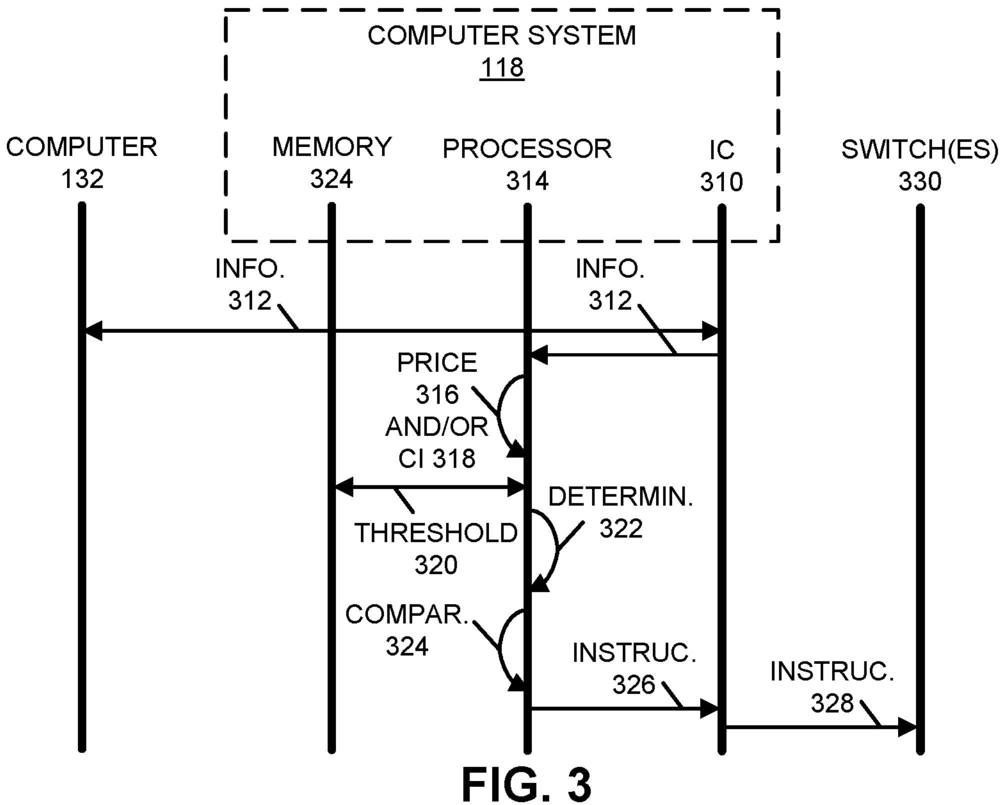
FIG. 3 is a drawing illustrating an example of communication between components in a computer system in FIG. 1 in accordance with an embodiment of the present disclosure.

Embodiments of the computational techniques are further illustrated in FIG. 3, which presents a drawing illustrating an example of communication among components in computer system 118. Notably, during the power-management techniques, interface circuit 310 in computer system 118 may obtain, from computer 132, information 312 associated with or that specifies a price of electricity and/or a carbon intensity (CI) of electricity provided by or associated with a supplier of an external power source.

After receiving information 312, interface circuit 310 may provide information 312 to processor 314 (and, more generally, a computation device, such as a graphics processing unit or GPU) in computer system 118. Using information 312, processor 314 may determine or estimate a price 316 of electricity and/or a carbon intensity 318 of electricity. Then, processor 314 may compare 324 price 316 and/or the carbon intensity 318 to a threshold 320 (which may be obtained from memory 324 in computer system 118. Alternatively or additionally, in some embodiments processor 314 may optionally dynamically determine 322 threshold 320.

When price 316 and/or the carbon intensity 318 exceeds threshold 320, processor may instruct 326 interface circuit 310 to provide one or more instructions 328 (e.g., in one or more packets or frames) to one or more switches 330 at a location. For example, interface circuit 310 may instruct a first switch in switches 330 or the first switch electrically connected to a reversing contactor to electrically decouple a dominant load at the location from an external power source. Moreover, interface circuit 310 may instruct a second switch in switches 330 or the first switch electrically connected to the reversing contactor to electrically couple the dominant load to an energy storage device at the location.

Alternatively, when price 316 and/or the carbon intensity 318 is less than threshold 320, interface circuit 310 may instruct the second switch or the first switch electrically connected to the reversing contactor to electrically decouple the dominant load from the energy storage device, and may instruct the first switch to electrically recouple the dominant load to the external power source.

While FIG. 3 illustrates some operations using unilateral or bilateral communication (which are, respectively, represented by one-sided and two-sided arrows), in general a given operation in FIG. 3 may involve unilateral or bilateral communication. Moreover, while FIG. 3 illustrates operations being performed sequentially or at different times, in other embodiments at least some of these operations may, at least in part, be performed concurrently or in parallel.

In some embodiments, the power-management techniques provide a solution that may be used with home (residential) consumers that represent 33% of US power consumption.

Consumer load behaviors are evolving toward more complicated approaches. Notably, HVAC and heat-pumps may create instant power peaks (increases) on power grids; smart thermostats and electric vehicles (EVs) may result in unpredictable increases or decreases in power consumption at the single home level and the state or network level; and solar and storage solutions may lack a standard for inverters, as well as centralized management and monitoring.

In an example of the power-management techniques, a cloud-based computer (such as computer system 118 in FIG. 1, which is sometimes referred to as a 'cloud virtual power plant') may dynamically switch the power supplied to a dominant load (e.g., an HVAC system) at one or more locations between an energy source (such as an external energy source, e.g., a power grid, a solar array) and an energy storage device (such as a battery) based at least in part on a current or estimated price of electricity (e.g., in a marketplace, such as a commodity or a spot market, or from a utility or power supplier) and/or the carbon intensity (such as the amount of carbon produced when generating the electricity). This dynamic switching may be implemented using switches (such as make-before-break breakers, switches, or a reversing contactor) at a given location. Notably, when the price of electricity and/or the carbon intensity exceeds a threshold (such as a consumer-defined threshold and/or a dynamically determined threshold that is based at least in part on an amount of stored power in the energy storage device, a regional demand in a power grid, an available regional supply in the power grid, the (local) carbon intensity of the grid, etc.), the cloud-based computer system may, via network (such as the Internet, a cellular-telephone system, a WLAN, etc.) instruct (or provide a command to) a first switch at the given location to electrically decouple the HVAC system from an external power source (such as the power grid) and then may instruct a second switch or the first switch electrically connected to the reversing contactor at the given location to electrically couple the HVAC system to the battery. The charger of the battery may also be communicatively connected to the cloud-based computer in order to charge when grid, the power carbon intensity and/or power price are low.

Similarly, when the price of electricity and/or the carbon intensity drops below the threshold, the cloud-based computer system may instruct the second switch at the given location to electrically decouple the HVAC or the heat-pump system from the battery and then may instruct the first switch at the given location to electrically couple the HVAC or the heat-pump system to the power grid, or may instruct the first switch electrically connected to the reversing contactor to electrically couple to the HVAC or the heat pump. These operations may be repeated dynamically or as needed based at least in part on fluctuations in the price of electricity and/or the carbon intensity of the grid. Moreover, while the cloud-based computer system may concurrently manage a large number of locations, the instructions and the thresholds used at these locations may be varied (e.g., the management of the given location may be independent of some or all of the other locations). Note that in some embodiments, the power-management techniques may include hysteresis (such as a 5-20% change in the threshold) to prevent excessive or too-frequent switching.

In some embodiments, the battery may be dedicated to the HVAC or the heat pump. Moreover, the switches, breakers, or reversing contactor may communicate wirelessly (e.g., using Wi-Fi and/or using low broadband frequencies).

Figure 4:
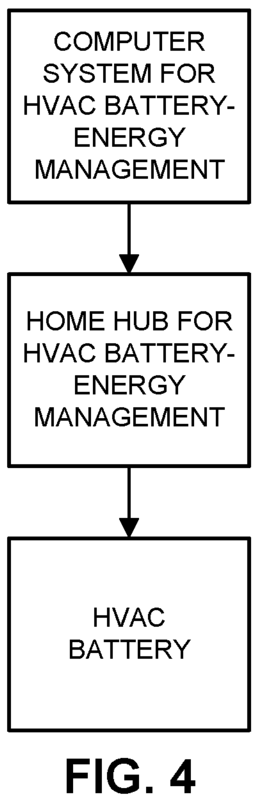
FIG. 4 is a drawing illustrating an example of a system in accordance with an embodiment of the present disclosure.
Figure 5:
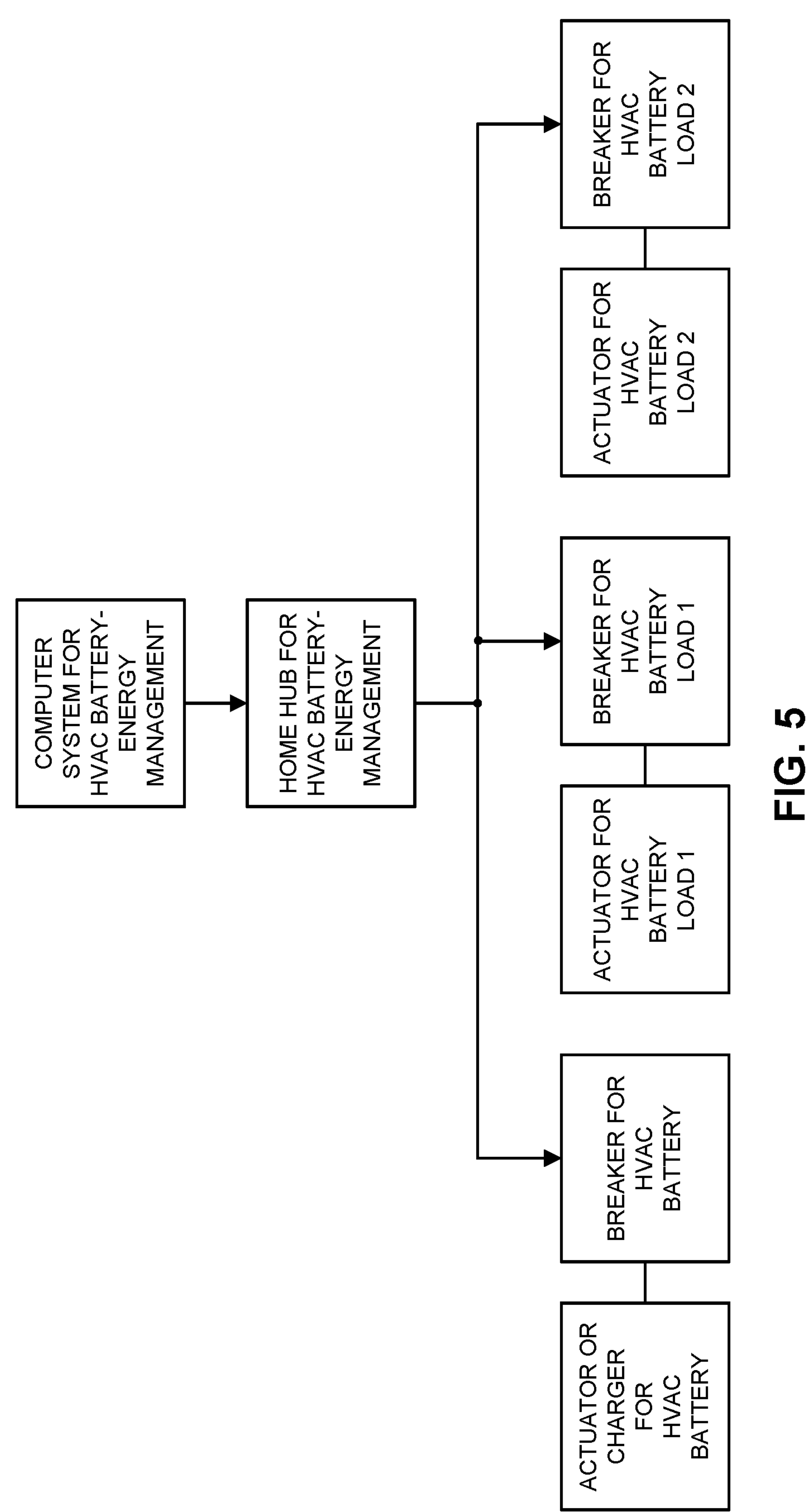
FIG. 5 is a drawing illustrating an example of a system in accordance with an embodiment of the present disclosure.
Figure 6:
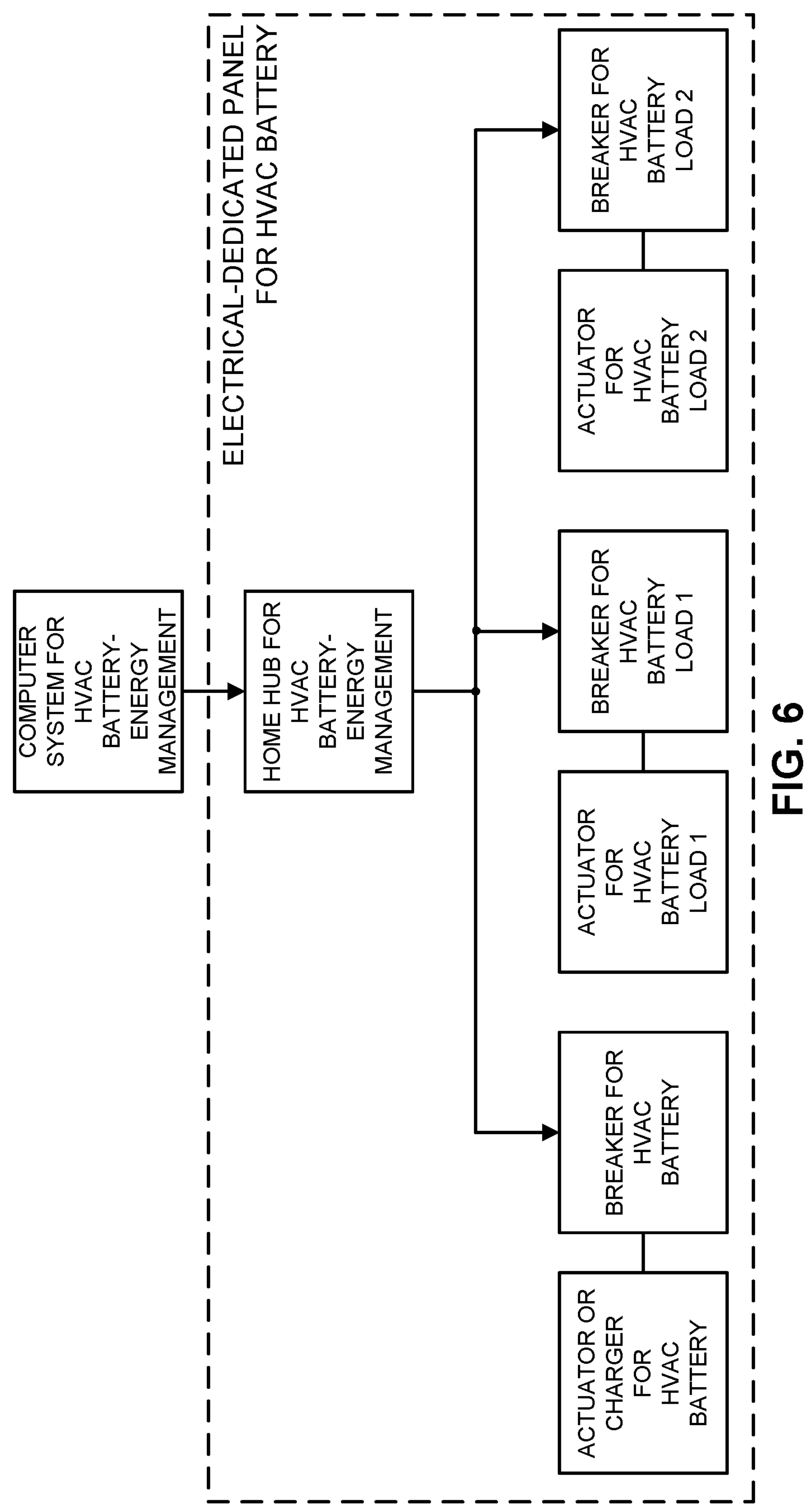
FIG. 6 is a drawing illustrating an example of a system in accordance with an embodiment of the present disclosure.
Figure 7:
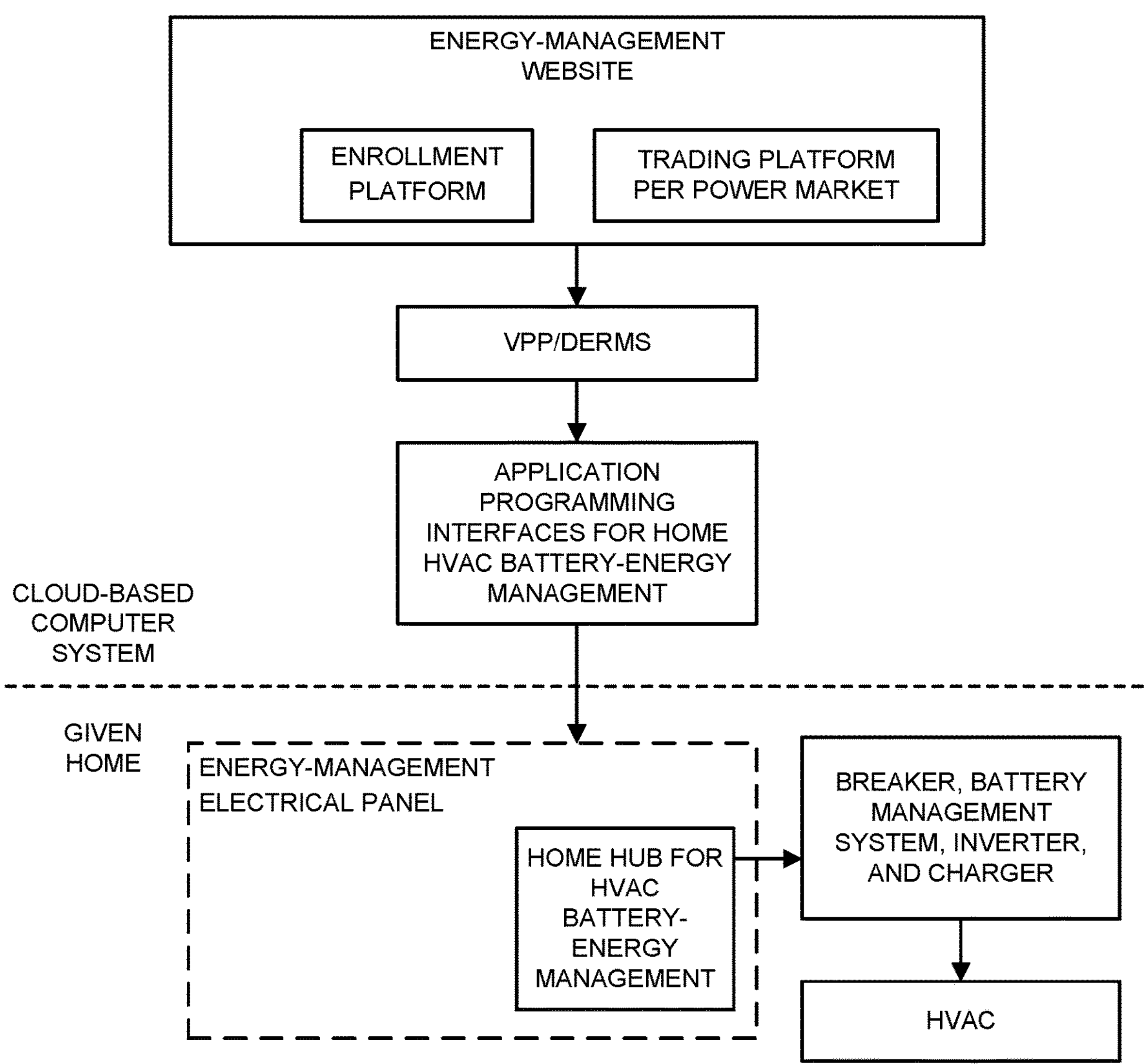
FIG. 7 is a drawing illustrating an example of a system in accordance with an embodiment of the present disclosure.
Figure 8:
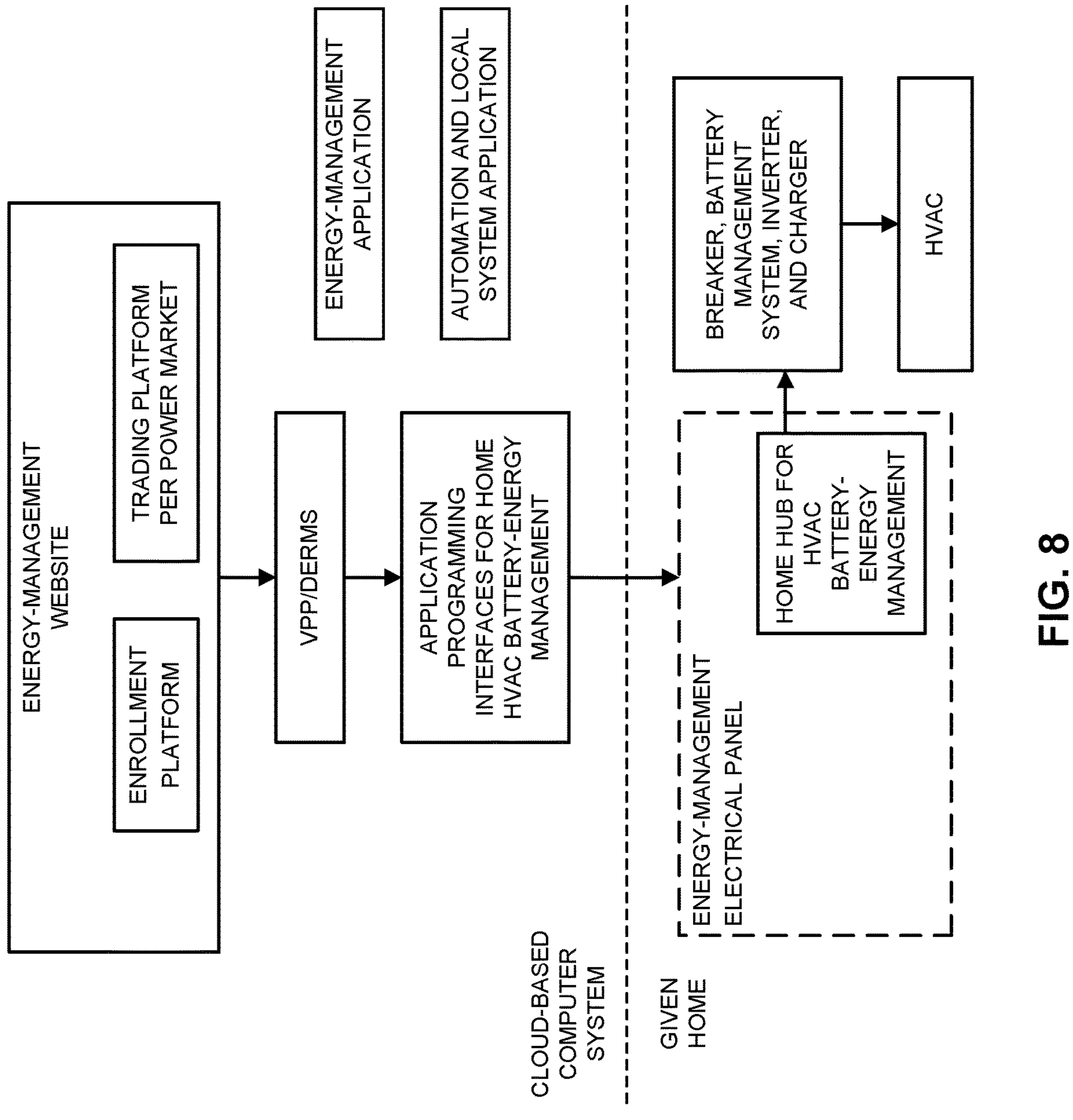
FIG. 8 is a drawing illustrating an example of a system in accordance with an embodiment of the present disclosure.

FIGS. 4-8, which present drawings illustrating examples of a system, illustrate (local) hardware infrastructure and cloud infrastructure. Note that FIG. 4 shows an example of a distributed virtual power plant (VPP)/DERMS for HVAC battery-energy management. Moreover, FIG. 5 shows an example of a HVAC DERMS for an HVAC battery/power bank. Furthermore, FIG. 6 shows an example of an electrical dedicated panel for an HVAC battery, which may be used in the HVAC DERMS shown in FIG. 5. Additionally, FIGS. 7 and 8 show examples of centralized energy management of dynamic energy-storage-devices at multiple locations.

The hardware infrastructure may include: a battery dedicated to an HVAC system; HVAC Wi-Fi-connected switches, breakers or a reversing contactor dedicated to the battery that is dedicated to the HVAC system; and/or a system that integrates these components. Moreover, the cloud infrastructure may include: a cloud-based virtual power plant that manages some or all of the hardware infrastructure; and/or the cloud-based virtual power plant using lower cloud resources (such as disaster recovery information technology resources) and capacities (such as storage information technology resources used for batteries trading).

The cloud-based virtual power plant may implement a pretrained predictive model (such as a pretrained machine-learning model and/or a pretrained neural network, e.g., a convolutional neural network) for performing at least some of the operations in the power-management techniques. Note that the pretrained machine-learning model may have been trained using a supervised-learning technique (such as a support vector machine, a classification and regression tree, logistic regression, LASSO, linear regression and/or another linear or nonlinear supervised-learning technique. Moreover, the pretrained neural network The power-management techniques may leverage or may be based at least in part on trading relationships. Notably, there may be data relationships with trading, infrastructure funds, commodity or power trading entities, power optimizers, transmission system operator, distributed system operator, etc. These trading relationships may provide information that is used to determine or estimate the current (or future) price of electricity (and, more generally, power) and/or the carbon intensity of electricity or power at one or more locations. In addition, the trading relationships may be used to provide platforms for redistributing revenue generated in the power-management techniques.

Note that the power-management techniques may help educate consumers about how to enroll and to receive services associated with the power-management techniques. The services may include local installation of hardware and/or software (such as the breakers) and/or an ongoing subscription to a cloud-based power-management service.

For example, as shown in FIG. 8, a consumer may request an HVAC battery either via a user interface on a web page or via a partner to a provide the power-management techniques. In response, a computer system may verify the consumer's address and the availability of service to this address. When the verification is successful, the consumer may be asked to: pick up the battery at a pickup location; or to have the battery delivered to their address. Alternatively, when the verification is not successful, the consumer may be included on a waiting list or queue, and may be provided updates about availability of the power-management techniques (such as one or more emails or text messages sent to an electronic device used or associated with the consumer).

Moreover, when the verification is successful, the consumer may authorize data sharing via a user interface (such as a consumer portal) displayed on a computer or an electronic device (such as by activating a virtual or a physical button, using a voice-recognition engine, etc.). The user may also provide permission for: potential time-of-user and remote management of a Wi-Fi switch, breaker or reversing contactor via a cloud-based computer system. Furthermore, the consumer may: accept terms and conditions and an end user license agreement of one or more partners; and/or perform an enrollment process for a virtual power plant and DERMS.

The web page may indicate an approximative time to delivery for the hardware and may display an image of the battery. Moreover, the web page may indicate or present contact information for a local electrician, who can install the hardware at the address and/or may provide training information or instructions (such as displaying a video) to the consumer for the electrician.

After the hardware is delivered, the electrician may set up the hardware at the address of the consumer. For example, the battery may be electrically connected to a home electrical panel or junction box using a single wire (which may include a positive, a negative or a ground). Then, the consumer may set up a mobile application on a portable electronic device, such as their cellular telephone. The consumer may access, control and/or track battery usage via the mobile application or a consumer portal (such as a web page). Once the hardware and software are up and running, the power-management techniques may be performed at the address for the consumer. Note that the cloud-based computer system may manage energy purchases (charging) and/or sale (discharging), including trading and/or data sharing for revenue generation.

In some embodiments, a third switch, a third breaker or a reversing contactor is used to dynamically control when an energy storage device (such as a battery) is charged, e.g., using a power source (such as an external power grid). Moreover, a fee in the power-management techniques may correspond to a difference between a charging price of the battery and a decoupling time interval of the dominant load (such as the HVAC or the heat-pump system) from the power grid to the battery. Thus, the fee may correspond to or may be a function of the savings associated with the power-management techniques.

The preceding embodiments may include fewer or additional components, different components two or more components may be combined into a single component, or a single component may be divided into two or more components. Moreover, different components may perform at least some operations in the power-management techniques. For example, an operation performed by the computer system may be performed by another component, such as a local computer at a location. Consequently, the power-management techniques may be implemented in a centralized and/or a distributed manner. Furthermore, the power-management techniques may include fewer operations, more operations or different operations (e.g., an operation may be changed).

Figure 9:
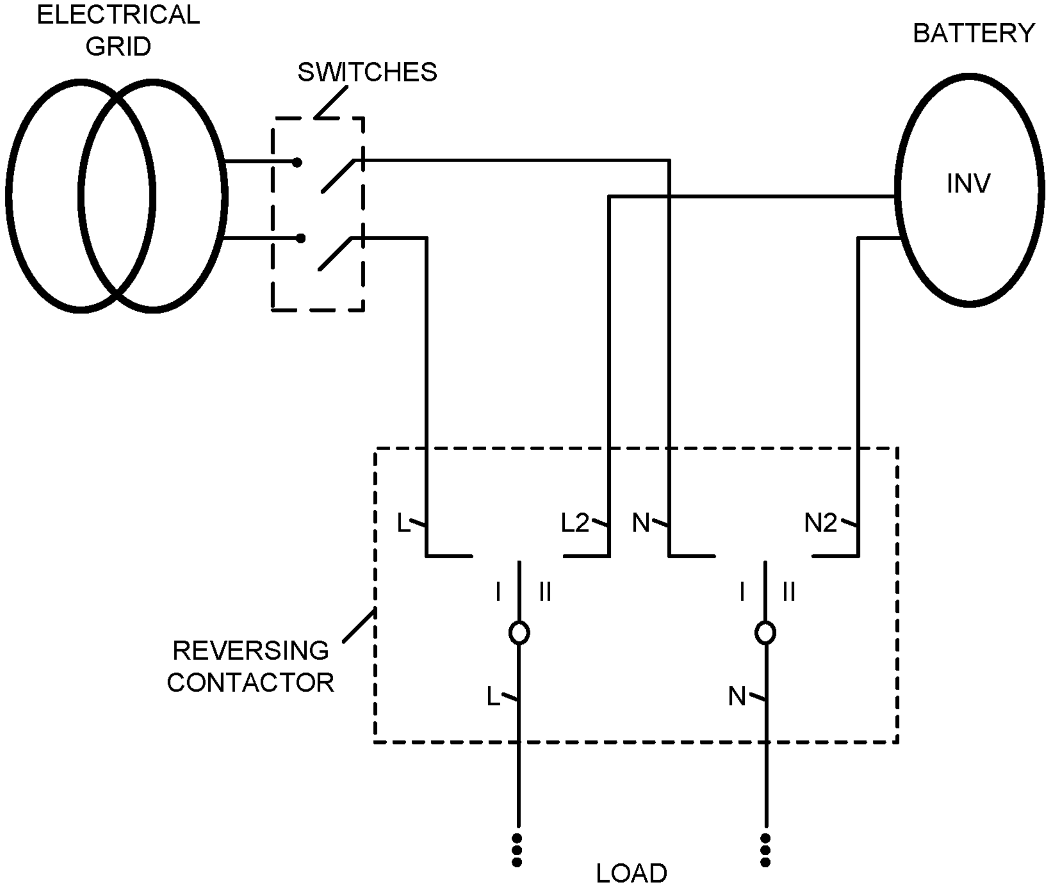
FIG. 9 is a drawing illustrating an example of a reversing contactor in accordance with an embodiment of the present disclosure.

We now describe embodiments of a reversing contactor. FIG. 9 presents a block diagram of an example of a reversing contactor. Notably, based at least in part on control signals, switches reverse a polarity of electrical signals applied to a load via the reversing contactor. Note that the reversing contactor is in one of: state I (with the electrical or power grid as the source and the switches in an ON state) with L and N connected to the corresponding L and N of the load;

or state II (with the battery inverter as the source and the switches in an OFF state) with L2 and N2 connected to L and N of the load.

Figure 10:
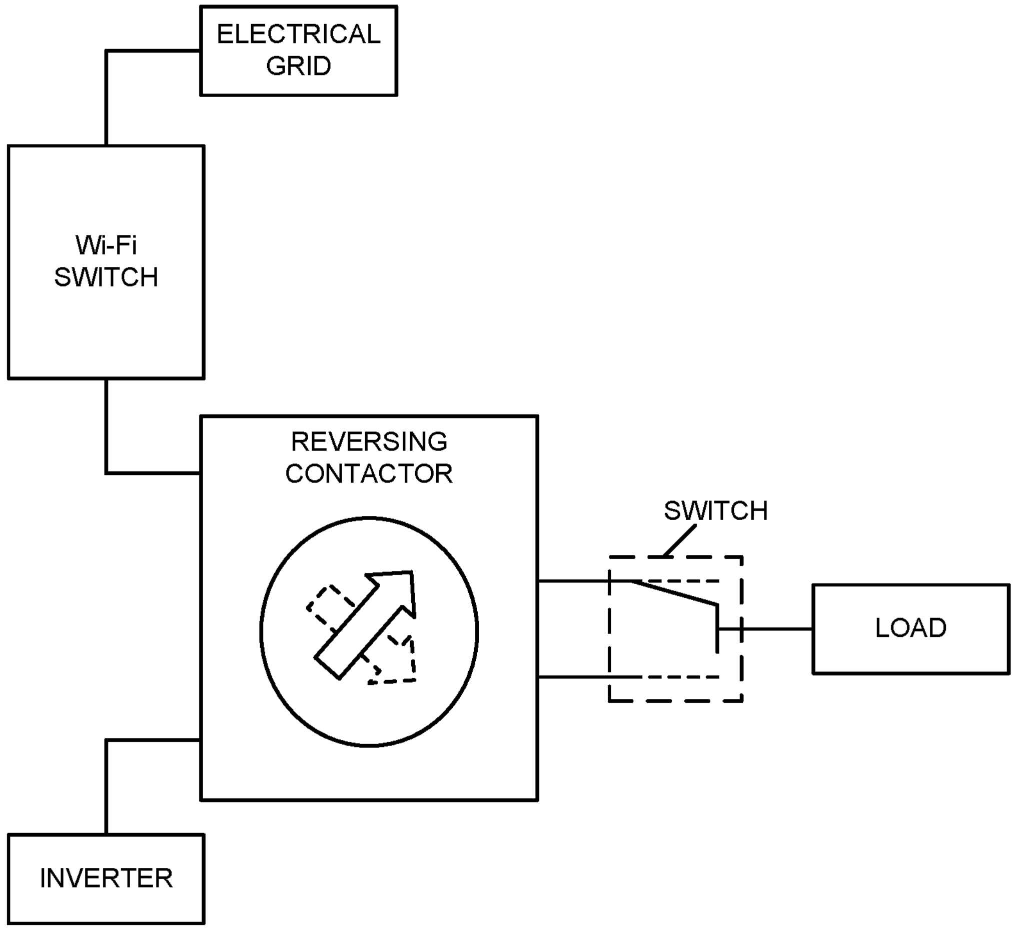
FIG. 10 is a drawing illustrating an example of a reversing contactor in accordance with an embodiment of the present disclosure.

FIG. 10 presents a block diagram of an example of a reversing contactor. In FIG. 10, current flows between the electrical or power grid connected to a switch and the reversing contactor. Current also flows between the battery inverter and the reversing contactor. When the power-grid switch is on, the reversing contactor is connected to the power grid. Alternatively, when the power-grid switch is off, the reversing contactor may automatically connect to the battery inverter and the power source may act as a backup energy source.

We now describe an electronic device that may implement at least some of the operations in the power-management techniques. FIG. 11 illustrates an electronic device, such as an electronic device installed at the location (e.g., a switch), a cellular telephone or a portable electronic device, or the cloud-based computer system. Notably, FIG. 11 presents a block diagram of an example of an electronic device 1100. This electronic device includes processing subsystem 1110, memory subsystem 1112, and networking subsystem 1114. Processing subsystem 1110 includes one or more devices configured to perform computational operations. For example, processing subsystem 1110 can include one or more microprocessors, application-specific integrated circuits (ASICs), microcontrollers, programmable-logic devices, one or more GPUs, and/or one or more digital signal processors (DSPs).

Memory subsystem 1112 includes one or more devices for storing data and/or instructions for processing subsystem 1110 and networking subsystem 1114. For example, memory subsystem 1112 can include dynamic random access memory (DRAM), static random access memory (SRAM), a read-only memory (ROM), flash memory, and/or other types of memory. In some embodiments, instructions for processing subsystem 1110 in memory subsystem 1112 include: one or more program modules or sets of instructions (such as program instructions 1122 or operating system 1124), which may be executed by processing subsystem 1110. For example, a ROM can store programs, utilities or processes to be executed in a non-volatile manner, and DRAM can provide volatile data storage, and may store instructions related to the operation of electronic device 1100. Note that the one or more computer programs may constitute a computer-program mechanism, a computer-readable storage medium or software. Moreover, instructions in the various modules in memory subsystem 1112 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1110. In some embodiments, the one or more computer programs are distributed over a network-coupled computer system so that the one or more computer programs are stored and executed in a distributed manner.

In addition, memory subsystem 1112 can include mechanisms for controlling access to the memory. In some embodiments, memory subsystem 1112 includes a memory hierarchy that comprises one or more caches coupled to a memory in electronic device 1100. In some of these embodiments, one or more of the caches is located in processing subsystem 1110.

In some embodiments, memory subsystem 1112 is coupled to one or more high-capacity mass-storage devices (not shown). For example, memory subsystem 1112 can be coupled to a magnetic or optical drive, a solid-state drive, or another type of mass-storage device. In these embodiments, memory subsystem 1112 can be used by electronic device 1100 as fast-access storage for often-used data, while the mass-storage device is used to store less frequently used data.

Figure 11:
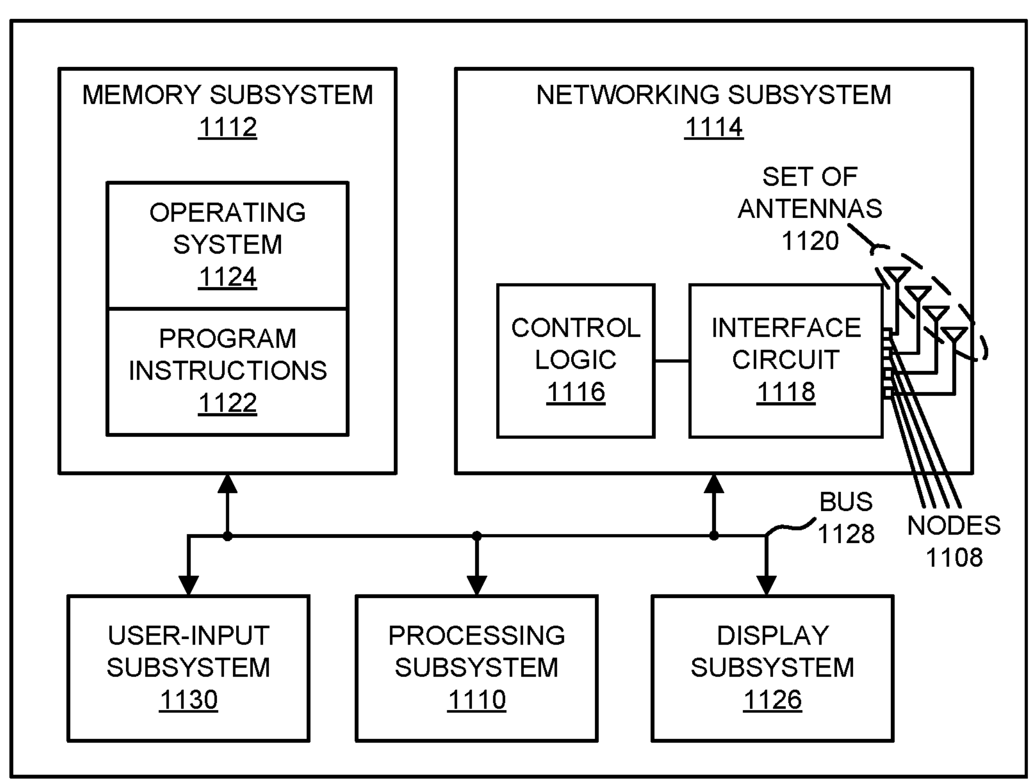
FIG. 11 is a block diagram illustrating an example of a computer in a computer system in FIG. 1 in accordance with an embodiment of the present disclosure.

Networking subsystem 1114 includes one or more devices configured to communicatively couple to and communicate on a wired and/or wireless network (i.e., to perform network operations), including: control logic 1116, an interface circuit 1118 and a set of antennas 1120 (or antenna elements) in an adaptive array that can be selectively turned on and/or off by control logic 1116 to create a variety of optional antenna patterns or 'beam patterns.' (While FIG. 11 includes set of antennas 1120, in some embodiments electronic device 1100 includes one or more nodes, such as nodes 1108 (which are sometimes referred to as 'antenna nodes'), e.g., a pad or a connector, which can be coupled to set of antennas 1120. Thus, electronic device 1100 may or may not include set of antennas 1120.) For example, networking subsystem 1114 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

In some embodiments, networking subsystem 1114 may include one or more radios.

Networking subsystem 1114 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1100 may use the mechanisms in networking subsystem 1114 for performing simple wireless communication between the electronic devices, e.g., transmitting advertising or beacon frames and/or scanning for advertising frames transmitted by other electronic devices.

Within electronic device 1100, processing subsystem 1110, memory subsystem 1112, and networking subsystem 1114 are coupled together using bus 1128 that facilitates data transfer between these components. Bus 1128 may include an electrical, optical, and/or electro-optical connection that the subsystems can use to communicate commands and data among one another. Although only one bus 1128 is shown for clarity, different embodiments can include a different number or configuration of electrical, optical, and/or electro-optical connections among the subsystems.

In some embodiments, electronic device 1100 includes a display subsystem 1126 for displaying information on a display, which may include a display driver and the display, such as a liquid-crystal display, a multi-touch touchscreen, etc. Display subsystem 1126 may be controlled by processing subsystem 1110 to display information to a user (e.g., information relating to management of a battery).

Electronic device 1100 can also include a user-input subsystem 1130 that allows a user of the electronic device 1100 to interact with electronic device 1100. For example, user-input subsystem 1130 can take a variety of forms, such as: a button, keypad, dial, touch screen, audio input interface, visual/image capture input interface, input in the form of sensor data, etc.

Electronic device 1100 can be (or can be included in) any electronic device with at least one network interface. For example, electronic device 1100 may include: a cellular telephone or a smartphone, a tablet computer, a laptop computer, a notebook computer, a personal or desktop computer, a netbook computer, a wearable computing device, a portable computing device, a consumer-electronic device, an access point, a router, a switch, communication equipment, as well as any other type of electronic computing device having wireless communication capability that can include communication via one or more wireless communication protocols.

Although specific components are used to describe electronic device 1100, in alternative embodiments, different components and/or subsystems may be present in electronic device 1100. For example, electronic device 1100 may include one or more additional processing subsystems, memory subsystems, networking subsystems, and/or display subsystems. Additionally, one or more of the subsystems may not be present in electronic device 1100. Moreover, in some embodiments, electronic device 1100 may include one or more additional subsystems that are not shown in FIG. 11. Also, although separate subsystems are shown in FIG. 11, in some embodiments some or all of a given subsystem or component can be integrated into one or more of the other subsystems or component(s) in electronic device 1100. For example, in some embodiments program instructions 1122 is included in operating system 1124 and/or control logic 1116 is included in interface circuit 1118.

Moreover, the circuits and components in electronic device 1100 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as an 'integrated circuit') may implement some or all of the functionality of electronic device 1100. This integrated circuit may include hardware and/or software mechanisms that are used for transmitting wireless signals from electronic device 1100 and receiving signals at electronic device 1100 from other electronic devices. Aside from the mechanisms herein described, radios are generally known in the art and hence are not described in detail. In general, networking subsystem 1114 and/or the integrated circuit can include any number of radios. Note that the radios in multiple-radio embodiments function in a similar way to the described single-radio embodiments.

In some embodiments, networking subsystem 1114 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals).

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), Open Artwork System Interchange Standard (OASIS), or C++ using Arduino Integrated Development Environment (IDE). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the power-management techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the power-management techniques may be implemented using program instructions 1122, operating system 1124 (such as a driver for interface circuit 1118) or in firmware in interface circuit 1118. Alternatively or additionally, at least some of the operations in the power-management techniques may be implemented in a physical layer, such as hardware in interface circuit 1118. In some embodiments, the power-management techniques are implemented, at least in part, in a MAC layer and/or in a physical layer in interface circuit 1118.

While examples of numerical values are provided in the preceding discussion, in other embodiments different numerical values are used. Consequently, the numerical values provided are not intended to be limiting.

Moreover, while the preceding embodiments illustrated the use of Wi-Fi during the power-management techniques, in other embodiments of the power-management techniques Bluetooth or Bluetooth Low Energy is used to communicate at least a portion of the information in the power-management techniques. Furthermore, the communication may use one or more bands of frequencies, including: 900 MHz, 2.4 GHz, 5 GHz, 6 GHz, 7 GHz, 60 GHz, a band of frequencies used by CBRS, and/or a band of frequencies used by LTE or another data communication protocol.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer system, comprising:

an interface circuit configured to communicate with one or more switches at a location;

a processor coupled to the interface circuit; and memory, coupled to the processor, storing program instructions, wherein, when executed by the processor, the program instructions cause the computer system to perform operations comprising:

determining or estimating a price of electricity, a carbon intensity of electricity, or both; and when the price of electricity, the carbon intensity of electricity, or both, exceeds a threshold, instructing a first switch in the switches or electrically connected to a reversing contactor to electrically decouple a dominant load at the location from an external power source and instructing a second switch at the location or the first switch electrically connected to the reversing contactor to electrically couple the dominant load to an energy storage device at the location, wherein the dominant load has a largest power consumption at the location, wherein the threshold comprises a dynamically determined threshold, and wherein the dynamically determined threshold is based at least in part on a regional demand in a power grid, a carbon intensity of the power grid, or an available regional supply in the power grid.

2. The computer system of claim 1, wherein the external power source comprises: a power grid associated with a utility or a power supplier, or a solar array.

3. The computer system of claim 1, wherein the dominant load comprises an HVAC system or a heat-pump system.

4. The computer system of claim 1, wherein the energy storage device comprises a battery.

5. The computer system of claim 1, wherein the computer system is remotely located from the location.

6. The computer system of claim 1, wherein, when the price of electricity, the carbon intensity of electricity, or both, is less than the threshold, the operations comprise:

instructing the second switch or the first switch electrically connected to the reversing contactor to electrically decouple the dominant load from the energy storage device; and instructing the first switch to electrically recouple the dominant load to the external power source.

7. The computer system of claim 1, wherein the computer system concurrently and independently manages multiple locations, which comprise the location.

8. The computer system of claim 1, wherein the threshold comprises a user-defined threshold.

9. The computer system of claim 1, wherein the switches comprise make-before-break switches, switches electrically connected to reversing contactors or breakers.

10. A non-transitory computer-readable storage medium for use with a computer system, wherein the non-transitory computer-readable storage medium stores program instructions that, when executed by the computer system, cause the computer system to perform operations comprising:

determining or estimating a price of electricity, a carbon intensity of electricity, or both; and when the price of electricity, the carbon intensity of electricity, or both, exceeds a threshold, instructing a first switch in switches or electrically connected to a reversing contactor to electrically decouple a dominant load at the location from an external power source and instructing a second switch at the location or the first switch electrically connected to the reversing contactor to electrically couple the dominant load to an energy storage device at the location, wherein the dominant load has a largest power consumption at the location, wherein the threshold comprises a dynamically determined threshold, and wherein the dynamically determined threshold is based at least in part on a regional demand in a power grid, a carbon intensity of the power grid, or an available regional supply in the power grid.

11. The non-transitory computer-readable storage medium of claim 10, wherein the external power source comprises: a power grid associated with a utility or a power supplier, or a solar array.

12. The non-transitory computer-readable storage medium of claim 10, wherein the energy storage device comprises a battery.

13. The non-transitory computer-readable storage medium of claim 10, wherein, when the price of electricity, the carbon intensity of electricity, or both, is less than the threshold, the operations comprise:

instructing the second switch or the first switch electrically connected to the reversing contactor to electrically decouple the dominant load from the energy storage device; and instructing the first switch to electrically recouple the dominant load to the external power source.

14. The non-transitory computer-readable storage medium of claim 10, wherein the dominant load comprises an HVAC system or a heat-pump system.

15. A method for managing switches, comprising:

by a computer system:

determining or estimating a price of electricity, a carbon intensity of electricity, or both; and when the price of electricity, the carbon intensity of electricity, or both, exceeds a threshold, instructing a first switch in the switches or electrically connected to a reversing contactor to electrically decouple a dominant load at the location from an external power source and instructing a second switch at the location or the first switch electrically connected to the reversing contactor to electrically couple the dominant load to an energy storage device at the location, wherein the dominant load has a largest power consumption at the location, wherein the threshold comprises a dynamically determined threshold, and wherein the dynamically determined threshold is based at least in part on a regional demand in a power grid, a carbon intensity of the power grid, or an available regional supply in the power grid.

16. The method of claim 15, wherein the external power source comprises: a power grid associated with a utility or a power supplier, or a solar array; and wherein the energy storage device comprises a battery.

17. The method of claim 15, wherein, when the price of electricity is less than the threshold, the method comprises:

instructing the second switch or the first switch electrically connected to the reversing contactor to electrically decouple the dominant load from the energy storage device; and instructing the first switch to electrically recouple the dominant load to the external power source.

18. The method of claim 15, wherein the threshold comprises a user-defined threshold.

19. The method of claim 15, wherein the dominant load comprises an HVAC system or a heat-pump system.

* * * * *